US007289567B2

(12) United States Patent
Classon et al.

(10) Patent No.: US 7,289,567 B2
(45) Date of Patent: Oct. 30, 2007

(54) APPARATUS AND METHOD FOR TRANSMITTING AND RECEIVING DATA USING PARTIAL CHASE COMBINING

(75) Inventors: Brian K. Classon, Palatine, IL (US); Amitava Ghosh, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 676 days.

(21) Appl. No.: 10/108,881

(22) Filed: Mar. 28, 2002

(65) Prior Publication Data

US 2002/0159384 A1 Oct. 31, 2002

Related U.S. Application Data

(60) Provisional application No. 60/287,437, filed on Apr. 30, 2001.

(51) Int. Cl.
  *H04K 1/10* (2006.01)
  *H04L 27/28* (2006.01)
  *H04L 1/18* (2006.01)
  *H08C 25/02* (2006.01)

(52) U.S. Cl. .................... 375/260; 370/464; 714/748

(58) Field of Classification Search ............... 370/216, 370/341, 464, 465, 335, 342, 477, 479; 375/260; 714/748, 749, 750, 751
See application file for complete search history.

(56) References Cited

U.S. PATENT DOCUMENTS 3,781,686 A * 12/1973 Ching .................... 375/245
4,317,196 A * 2/1982 Ulug ..................... 370/391
5,490,180 A * 2/1996 Muto .................... 375/347
5,706,309 A * 1/1998 Eberlein et al. ........... 375/260
5,765,097 A * 6/1998 Dail ..................... 725/125
5,931,964 A * 8/1999 Beming et al. ........... 714/748
5,946,320 A * 8/1999 Decker .................. 370/428
5,966,384 A   10/1999 Felix et al.
6,212,240 B1* 4/2001 Scheibel et al. ........... 375/261
6,247,150 B1* 6/2001 Niemela ................. 714/748
6,690,657 B1* 2/2004 Lau et al. ................ 370/315
6,779,146 B1* 8/2004 Jones et al. .............. 714/748
6,870,826 B1* 3/2005 Ishizu .................... 370/465
7,072,307 B2* 7/2006 Tong et al. .............. 370/465
2001/0052104 A1* 12/2001 Xu et al. ................ 714/792
2002/0067780 A1* 6/2002 Razzell .................. 375/341
2002/0152342 A1* 10/2002 Das et al. ............... 710/117
2002/0172294 A1* 11/2002 Cheng ................... 375/281

OTHER PUBLICATIONS

Chase, D. et al. "Application of Code Combining to a Selective-Repeat ARQ Link." *IEEE Military Communications Conference*; Oct. 1985, pp. 247-252.

* cited by examiner

*Primary Examiner*—Betsy L. Deppe

(57) ABSTRACT

An apparatus and method for transmitting and receiving data, wherein retransmissions of information can be a different size from the initial transmission. The invention utilizes a partial Chase encoder 306 to truncate or expand data depending on the availability of channel resources for retransmission. A partial Chase combiner 314 processes the received demodulated data based solely on the number of codes and modulation received (i.e., predetermined, with no additional signaling required). If the received retransmission is smaller than the first transmission, only a portion of the soft bits are combined. If the retransmission is larger than the first transmission, some values of the stored first transmission are combined with more than one received soft bit in the retransmission.

12 Claims, 4 Drawing Sheets

—PRIOR ART—

APPARATUS AND METHOD FOR TRANSMITTING AND RECEIVING DATA USING PARTIAL CHASE COMBINING

REFERENCE(S) TO RELATED APPLICATION(S)

The present application claims priority from provisional application, Ser. No. 60/287,437, entitled "APPARATUS AND METHOD FOR TRANSMITTING AND RECEIVING DATA USING PARTIAL CHASE COMBINING," filed Apr. 30, 2001, which is commonly owned and incorporated herein by reference in its entirety.

FIELD OF THE INVENTION

The present invention relates generally to communication systems and in particular to performing partial Chase encoding and combining with unequal sized transmissions.

BACKGROUND OF THE INVENTION

Hybrid ARQ (HARQ) has been shown to provide advantages in communication system throughput, and has been shown to make the system robust to modulation and coding scheme (MCS) selection errors. Full Chase combining is the simplest form of HARQ. In the full Chase combining scheme, retransmissions of information are simply repetitions of the initial transmission. A Chase HARQ decoder is easier to implement than a full incremental redundancy (IR) HARQ decoder because the joint transmission decoder for Chase combining consists of a single soft storage buffer and soft combiner followed by the decoder that was used for the first transmission. For IR, soft storage must be provided for each transmission (i.e., no combining is performed), and the joint decoder must process all received data.

Full Chase HARQ has been implemented in a transmitter/receiver chain of a communications device such as that shown in FIG. 1. The channel encoder and decoder blocks may include functions such as cyclic redundancy check (CRC) coding and rate-matching as well as forward error correction (FEC) coding with a turbo, convolutional, Bose-Chaudhuri-Hocquenghem (BCH), or other code (including adding tail bits, if any). The block interleaver and deinterleaver reorder the bits/values received to help the channel encoder and decoder provide a diversity benefit. The modulator and demodulator blocks may include QPSK, 8PSK, MQAM, or other modulations, as well as Walsh code demultiplexing and spreading. The full Chase combining function can occur before or after the block de-interleaver as known in the art.

A potential drawback of full Chase HARQ is that every retransmission of information must be the same size as the original transmission. With certain combinations of traffic, such as voice and supplemental channel data, the available channel resources, such as code space, time slots, frequency channels, or streams, may change causing current HARQ transmissions to abort because of insufficient code space for further retransmissions. Similarly, changes in the code space may provide additional code resources that a current user cannot take advantage of because in full Chase HARQ, retransmissions are the same size as the initial transmission.

Thus, there is a need for an apparatus and method for transmitting and receiving data, wherein retransmissions of information can be a different size from the initial transmission.

DETAILED DESCRIPTION OF THE PRESENTLY PREFERRED EMBODIMENT

Figure 1:
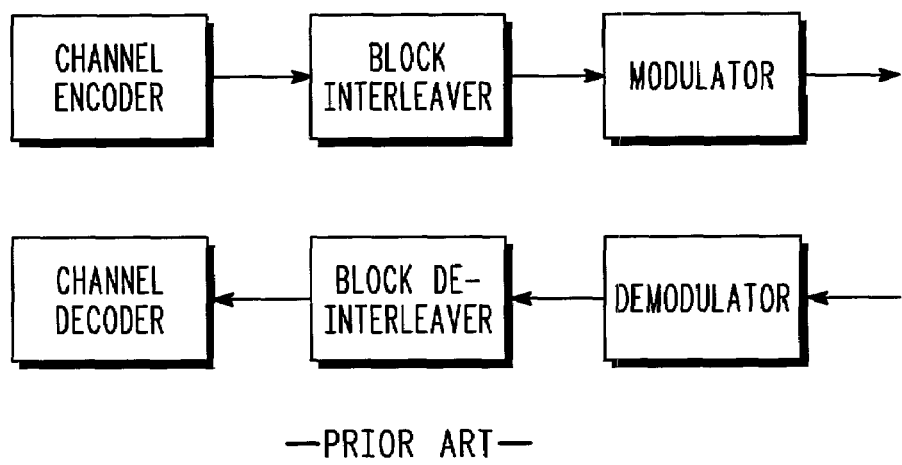
FIG. 1 is a portion of a transmitter/receiver chain of a communications device that is used with the full Chase HARQ scheme of the prior art.
Figure 2:
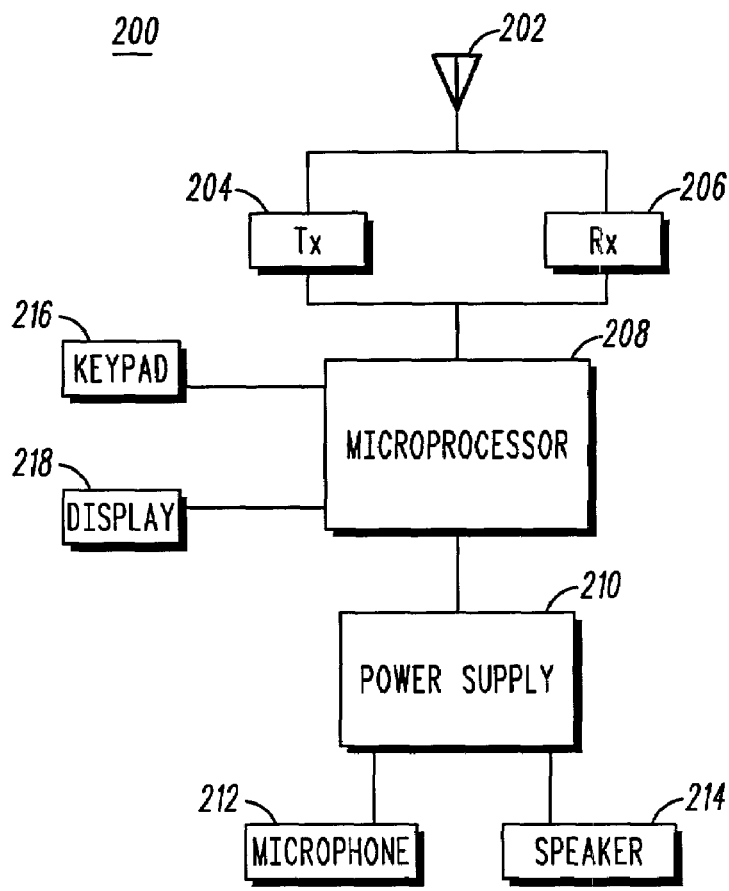
FIG. 2 is a preferred embodiment of a communications device that can implement the partial Chase HARQ scheme in accordance with the present invention.

The partial Chase HARQ technique used in the preferred embodiment of the present invention seeks to obtain the benefit of variable size transmissions with minimal impact on current communication systems. In the preferred embodiment of the present invention, the partial chase HARQ techniques can be implemented in a communications device, such as a mobile station (MS). FIG. 2 is a block diagram showing some components of a typical MS 200. As shown, the MS 200 can include an antenna 202, a transmitter 204, a receiver 206, a microprocessor 208 including a memory (not shown), a power supply IC 210, a microphone 212, a speaker 214, a keypad 216 and a display 218. The antenna 202 receives signals from the receiver 206 and transmits signals to the transmitter 204. These signals are processed by the microprocessor 208. The microprocessor 208 also processes inputs from the keypad 216 and sends outputs to the display 218. The power supply IC 210 is coupled to the microphone 212 and speaker 214 to control the power supplied thereto. In alternate embodiments of the present invention, the partial Chase HARQ technique can be implemented in other communications devices such as a pager, a personal digital assistant (PDA), and the like.

Figure 3:
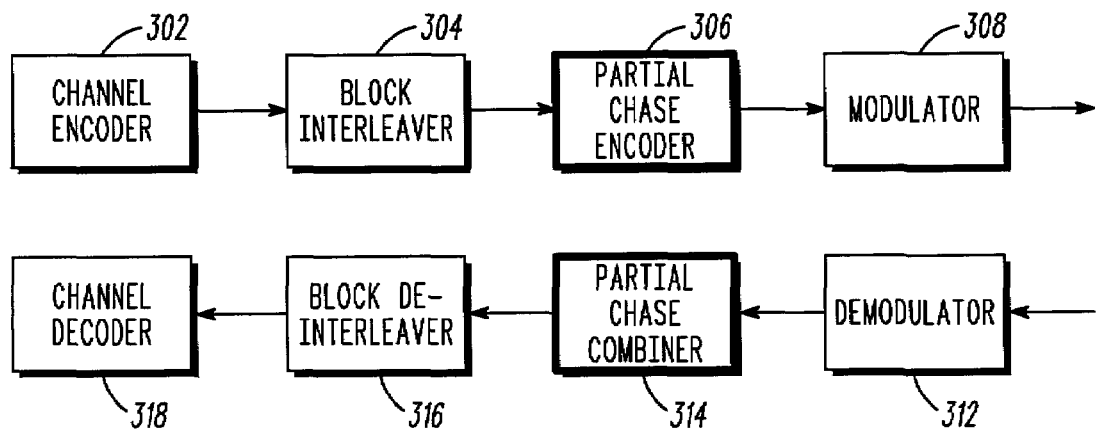
FIG. 3 is a portion of a transmitter/receiver chain that can be implemented in an apparatus in accordance with the preferred embodiment of the present invention.

A portion of the transmitter 204 and receiver 206 of FIG. 2 is shown in FIG. 3. The partial Chase HARQ technique utilizes a partial Chase encoder 306 coupled between the block interleaver 304 and modulator 308, and a partial Chase combiner 314 coupled to the demodulator 312 and block de-interleaver 316. Because the channel encoder 302, block interleaver 304, modulator 308, demodulator 312, block deinterleaver 316 and channel decoder operate as commonly known in the art, no further details are provided herein. The partial Chase encoder 306 and partial Chase combiner 314 can be implemented in hardware (e.g., using configurable logic and RAM memory on the Virtex XCV2000E from Xilinx) or software (e.g., in code running on the MSC8102 DSP from Motorola).

The partial Chase encoder 306 truncates or expands the interleaved data received from the block interleaver 304 depending on the availability of channel resources for retransmission. In the preferred embodiment, the invention is implemented in the 1XTREME EV-DV (proposal to evolve cdma2000 to provide both data and voice (1x EV-DV) code division multiple access (CDMA) system in which the channel resources are orthogonal codes, such as Walsh codes. However, in an alternate embodiment, the invention can be implemented in a 3GPP W-CDMA system in which the channel resources are Orthogonal Variable Spreading Factor (OVSF) codes. In other alternate embodiments, the channel resources could be time slots in a time division multiple access (TDMA) system or frequencies in a frequency division multiple access (FDMA) or OFDM system. In the preferred embodiment, the partial Chase combiner 314 processes the received data based solely on the number of codes and modulation received (i.e., predetermined, with no additional signaling required). If the received retransmission is smaller than the first transmission, only a portion of the soft bits are combined. If the retransmission is larger than the first transmission, some values of the stored first transmission are combined with more than one received soft bit in the retransmission. After combining, the deinterleaver 316 and channel decoder 318 can then operate on a buffer the same size as used on the first transmission.

Figure 4:
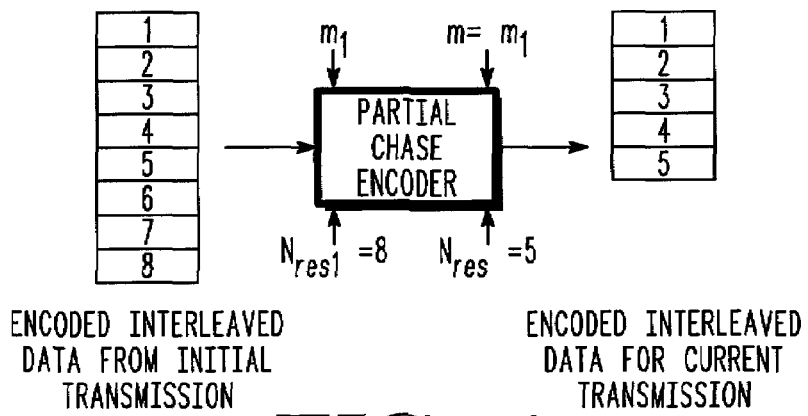
FIG. 4 is an example of partial Chase encoding with less code resources available for retransmission of information due to changes in the available Walsh code space and with no change in the MCS.

Details of the operation of the partial chase encoder will now be described with reference to FIG. 4. FIG. 4 shows an example of partial Chase encoding with less code resources available for the current transmission (retransmission) of information due to changes in the available Walsh code space. Specifically, the number of resources available for the first transmission (Nres1) is eight (8), and five (5) code resources (Nres=5) are available for the retransmission. The desired modulation order m (m=log2 M bits per symbol in an M signal constellation like MQAM) is unchanged (m=m1) for the retransmission. It should be noted that the modulation order may change for the retransmission due to changes in channel conditions. It should also be noted that the code numbers are logical labels and do not necessarily correspond to a particular code resource. Further, on the receive side, data to be combined could have been transmitted using the same or different physical Walsh sequences.

As shown in FIG. 4, the partial chase encoder 306 receives four (4) inputs—the modulation order of the MCS used to modulate the data in the first transmission (m1), the modulation order of the MCS used to modulate the data in the retransmission (m), Nres1 and Nres. The partial Chase encoder 306, receiving input that the MCS for the retransmission is the same as that for the initial transmission and receiving input that only 5 resources are available for the retransmission, will cause information, preferably interleaved encoded bits, on only 5 codes to be retransmitted. Interleaved encoded bits on three (3) of the eight (8) codes originally transmitted will not be transmitted. In the preferred embodiment, interleaved encoded bits on the first five (5) codes will be retransmitted. However, it will be recognized by one of ordinary skill in the art that interleaved encoded bits on any 5 codes could be retransmitted.

In a more detailed explanation of the partial Chase encoding function shown in FIG. 4, if the initial transmission had 80 encoded interleaved data bits (10 bits per code, bits 1-10 on the first code resource, bits 11-20 on the second code resource, etc), the retransmission repeats 50 bits on the five available codes (bits 1-10 on the first code resource, etc). On a second retransmission with 5 available codes, bits 1 to 50 can be sent again, but it is desirable to send the bits that have not yet been resent to ensure performance comparable to a full Chase encoder. In the case of 5 available codes on the second retransmission, 50 bits are sent on the five available codes (bits 51-60 on the first code resource, bits 61-70 on the second code resource, bits 71-80 on the third code resource, bits 1-10 on the fourth code resource, and bits 11-20 on the fifth code resource).

The partial Chase encoder 306 can also be used when more code resources are available for retransmission of interleaved encoded bits due to changes in the available Walsh code space. For example, if in FIG. 4, Nres1=5 and Nres=8, the encoder 306 will cause interleaved encoded bits on all 5 codes to be retransmitted at least once (bits 1-50 on the first 5 codes, and bits 1-30 on the last 3 codes).

Figure 5:
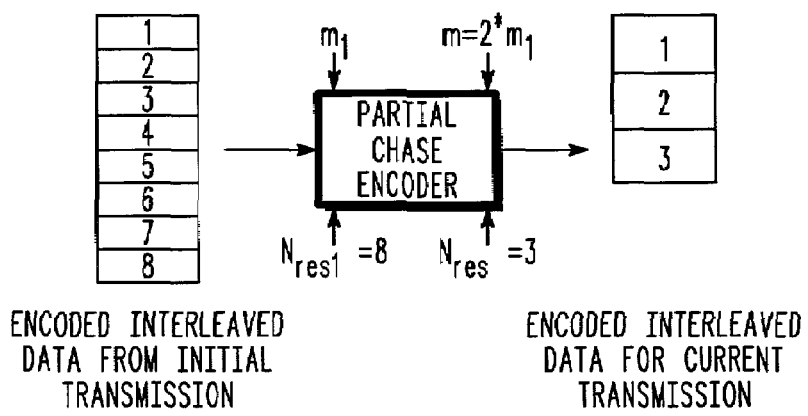
FIG. 5 is an example of partial Chase encoding with less code resources available for retransmission of information and an MCS change from QPSK for the data on the initial transmission to 16 QAM for the data on the retransmission.

The partial Chase encoder 306 can also be used when the MCS changes for the retransmission. FIG. 5 shows an example where the MCS changed from quadrature phase shift keying (QPSK) for the data on the initial transmission to 16 quadrature amplitude modulation (QAM) for the data on the retransmission. Since 16 QAM is twice as spectrally efficient as QPSK (represented as m=2*m1 in FIG. 5), a single 16 QAM code can carry the same information as 2 QPSK codes. In the example of FIG. 5, the available code space changed from Nres1=8 for the initial transmission to Nres=3 for the retransmission. Thus, the interleaved encoded bits carried on codes 1 and 2 in the initial transmission will be carried on code 1 in the retransmission. The interleaved encoded bits carried on codes 3 and 4 in the initial transmission will be carried on code 2 in the retransmission. The interleaved encoded bits carried on codes 5 and 6 in the initial transmission will be carried on code 3 in the retransmission. Since there are no more resources available for the retransmission, the interleaved encoded bits carried on codes 7 and 8 in the initial transmission will not be transmitted. While all combinations of modulation order change and code resource change can be handled with the partial Chase encoder 306, combinations where Nres1*m1/m is an integer value are most efficient.

In a more detailed explanation of the partial chase encoding function shown in FIG. 5, if the initial transmission had 80 encoded interleaved data bits (10 bits per code, bits 1-10 on the first code resource, bits 11-20 on the second code resource, etc), the retransmission repeats 60 bits on the three available codes (bits 1-20 on the first code resource, bits 21-40 on the second code resource, and bits 41-60 on the third code resource).

The partial Chase encoder 306 can also be used in the example of FIG. 5 when more code resources are available for the retransmission of interleaved encoded bits due to changes in the available Walsh code space. For example, if in FIG. 5, Nres1=3 and Nres=8, the interleaved encoded bits carried on QPSK codes 1 and 2 in the initial transmission will be carried on 16 QAM code 1 in the retransmission. The interleaved encoded bits carried on QPSK code 3 in the initial transmission will be carried on the first half of 16

QAM code 2 in the retransmission. Preferably, any unused code space in the retransmission will be filled with repetitions of the interleaved encoded bits carried on QPSK codes 1, 2 and 3 in the initial transmission. For example, the second half of 16 QAM code 2 in the retransmission will repeat the interleaved encoded bits carried on QPSK code 1 in the initial transmission, the first half of 16 QAM code 3 in the retransmission will repeat the interleaved encoded bits carried on QPSK code 2 in the initial transmission, and so on.

Figure 6:
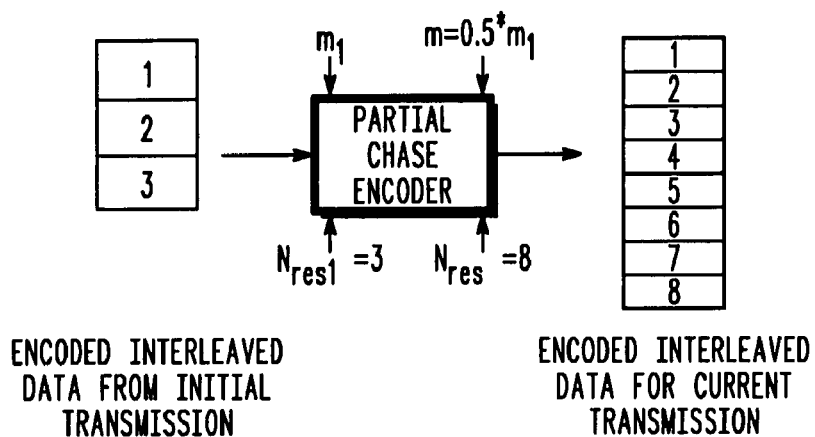
FIG. 6 is an example of partial Chase encoding with more code resources available for retransmission of information and an MCS change from 16 QAM for the data on the initial transmission to QPSK for the data on the retransmission.

As noted in the previous paragraph, if the available Walsh space increases, it may be desirable to increase the code resource usage on the retransmission. This may happen in conjunction with a desired change in the modulation order for the retransmission, e.g., 16 QAM to QPSK. FIG. 6 shows an example where the available code space increased from 3 codes (Nres1=3) for the initial transmission to 8 codes (Nres=8) for the retransmission, with a change in modulation from 16 QAM to QPSK (m=0.5*m1). Because QPSK is half as spectrally efficient as 16 QAM, 2 QPSK codes are required to carry the same information as a single 16 QAM code. Thus, the interleaved encoded bits carried on 16 QAM code 1 in the initial transmission will be carried on QPSK codes 1 and 2 in the retransmission. The interleaved encoded bits carried on 16 QAM code 2 in the initial transmission will be carried on QPSK codes 3 and 4 in the retransmission. The interleaved encoded bits carried on 16 QAM code 3 in the initial transmission will be carried on QPSK codes 5 and 6 in the retransmission. The final two QPSK codes 7 and 8 in the retransmission are a repeat of interleaved encoded bits on the first 16 QAM code of the initial transmission.

In a more detailed explanation of the partial chase encoding function shown in FIG. 6, if the initial transmission had 60 encoded interleaved data bits (20 bits per code, bits 1-20 on the first code resource, bits 21-40 on the second code resource, etc), the retransmission repeats 80 bits on the eight available codes (bits 1-10 on the first code resource, bits 11-20 on the second code resource, bits 21-30 on the third code resource, bits 31-40 on the fourth code resource, bits 41-50 on the fifth code resource, bits 51-60 on the sixth code resource, bits 1-10 on the seventh code resource, and bits 11-20 on the eight code resource).

The partial Chase encoder 306 can also be used in the example of FIG. 6 when less code resources are available for retransmission of interleaved encoded bits due to changes in the available Walsh code space. For example, if in FIG. 6, Nres1=8 and Nres=3, the interleaved encoded bits carried on the first half of 16 QAM code 1 in the initial transmission will be carried on QPSK code 1 in the retransmission. The interleaved encoded bits carried on the second half of 16 QAM code 1 in the initial transmission will be carried on QPSK code 2 in the retransmission. The interleaved encoded bits carried on the first half of 16 QAM code 2 in the initial transmission will be carried on QPSK code 3 in the retransmission. Because there are no further resources available for the retransmission the second half of 16 QAM code 2 through the second half of 16 QAM code 8 will not be transmitted.

It should be noted that the pre-determined selection of interleaved encoded bits to repeat in the partial Chase encoder 306 can vary as a function of retransmission. For example, if an initial transmission (8 codes available) uses codes 1 to 8, a first retransmission (2 codes available) can repeat the interleaved encoded bits carried on codes 1 and 2 of the initial transmission, and a second retransmission (7 codes available) can repeat the interleaved encoded bits carried on codes 3-8 and 1 of the initial transmission. In this manner, the partial Chase combining can achieve the residual frame error rate performance of full Chase combining when the same total number of codes has been sent and the same modulation is used.

Figure 7:
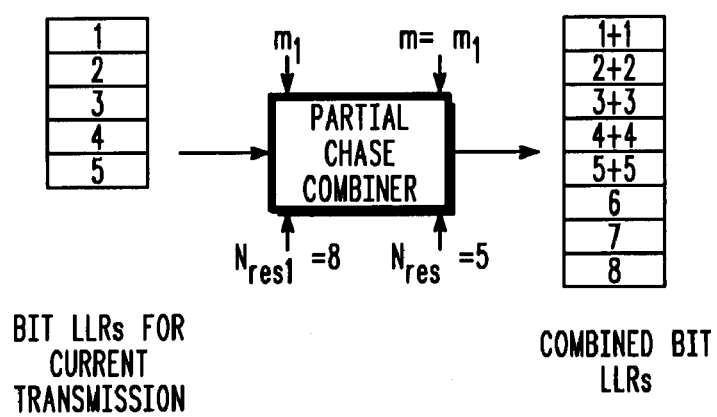
FIG. 7 is an example of partial Chase combining of a portion of the LLRs from an initial transmission with the LLRs from a retransmission where the initial transmission used more resources than the retransmission and where there was no change in the MCS.
Figure 8:
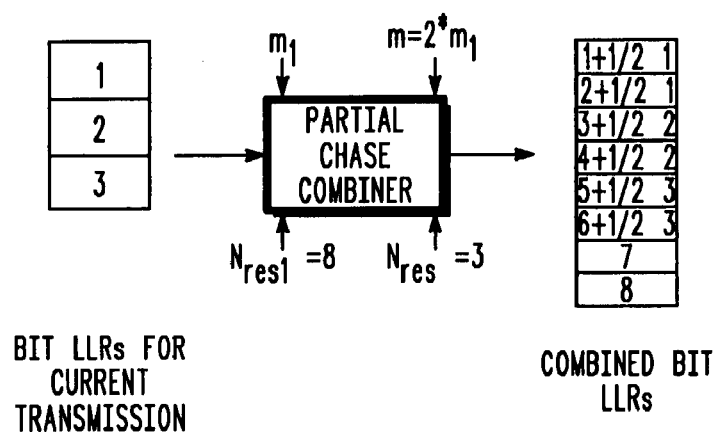
FIG. 8 is an example of partial Chase combining of a portion of the LLRs from an initial transmission with the LLRs from a retransmission where the initial transmission used more resources than the retransmission and where the MCS changed from QPSK to 16 QAM.
Figure 9:
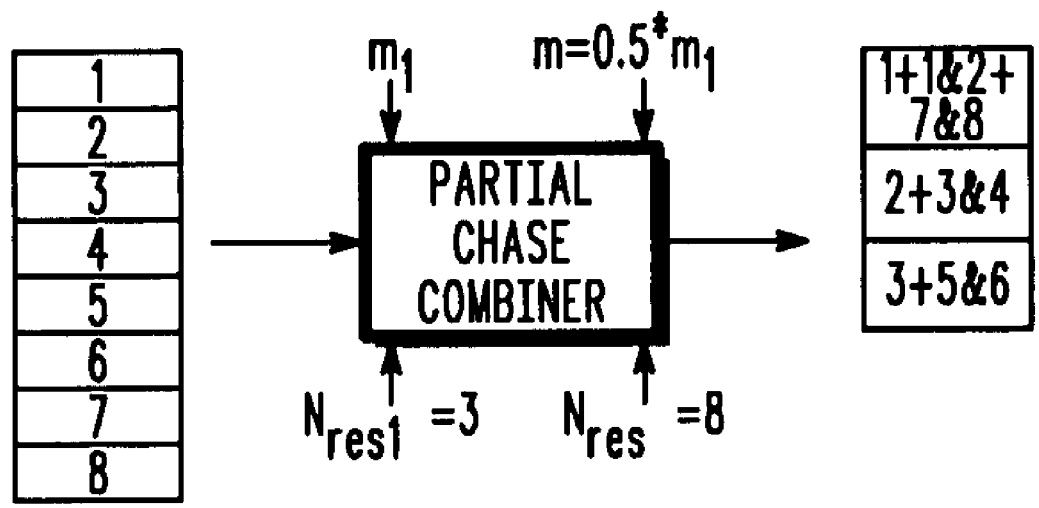
FIG. 9 is an example of partial Chase combining of the LLRs from an initial transmission with the LLRs from a retransmission where the initial transmission used less resources than the retransmission and where the MCS changed from 16 QAM to QPSK.

The three examples in FIGS. 4-6 for the partial Chase encoder 306 in the transmitter chain of FIG. 3 are continued in FIGS. 7-9 for the partial Chase combiner 314 in the receiver chain of FIG. 3. In FIGS. 7-9, the information carried on the codes in the initial transmission and retransmission are demodulated soft values, e.g., bit log likelihood ratios (LLRS) in the preferred embodiment, instead of interleaved encoded bits. The combiner 314 combines the LLRs from the initial transmission and retransmissions in a combined bit LLR buffer (cbuf). The size of the buffer is determined by the initial transmission. The LLRs from the initial transmission can be stored in receiver memory (rbuf) until being transferred to the cbuf. Alternatively, the LLRs from the initial transmission can be stored directly in the cbuf. In the example of FIG. 7, the partial Chase combiner 314 combines a portion of the LLRs from the initial transmission on 8 codes (Nres1=8) with LLRs from the retransmission on 5 codes (Nres=5). (The modulation order did not change.) The contents of the cbuf are shown after the first retransmission. Specifically, FIG. 7 shows that the LLRs from the initial transmission on code 1 are combined with the LLRs from the retransmission on code 1. Likewise, the LLRs from the initial transmission on code 2 are combined with the LLRs from the retransmission on code 2, and so on. As shown in FIG. 7, the LLRs from initial transmissions on codes 6, 7 and 8 are not combined since no resources were available to retransmit interleaved encoded bits on codes 6, 7 and 8. In the preferred embodiment, the '+' notation shown in the combined bit LLR buffer denotes simple addition since bit LLRs are provided as part of the demodulation process. In an alternate embodiment, the "+" notation may denote max-ratio combining (averaging for equal gain) of demodulated soft values provided as part of the demodulation process.

In a more detailed explanation of the partial chase combining function shown in FIG. 7, if the initial transmission had 80 encoded interleaved data bits, the cbuf will contain 80 bit LLRs. The rbuf contains 50 bit LLRs. The partial Chase combiner 314 will combine the first 50 bit LLRs in cbuf with the contents of rbuf. In the case of 5 available codes on the second retransmission, the rbuf will again contain 50 bit LLRs. Bit LLRs 1 to 30 in rbuf are added to the combined bit LLRs 51 to 80 in cbuf, and bit LLRs 31 to 50 in rbuf are added to combined bit LLRs 1 to 20 in cbuf.

The partial Chase combiner 314 can also be used when more code resources were available for retransmission of interleaved encoded bits due to changes in the available Walsh code space. For example, if in FIG. 7, Nres1=5 and Nres=8, the cbuf would reflect the following:

| |
|---|
| 1 + 1 + 6 |
| 2 + 2 + 7 |
| 3 + 3 + 8 |
| 4 + 4 |
| 5 + 5 |

In the example of FIG. 8, the partial Chase combiner 314 combines a portion of the LLRs from the initial transmission on 8 codes (Nres1=8) with LLRs from the retransmission on 3 codes (Nres=3). In this example, the modulation order changed from QPSK to 16 QAM (m=2*m1). The contents of the combined bit LLR buffer is shown after the first retransmission. The '½' notation is used to indicate using the first or second half portion of the currently received bits on a code that has a higher modulation order. Specifically, FIG. 8 shows that the LLRs from the initial transmission on code 1 are combined with the LLRs from the retransmission on the first half of code 1. The LLRs from the initial transmission on code 2 are combined with the LLRs from the retransmission on the second half of code 1. The LLRs from the initial transmission on code 3 are combined with the LLRs from the retransmission on the first half of code 2. The LLRs from the initial transmission on code 4 are combined with the LLRs from the retransmission on the second half of code 2, and so on. As shown in FIG. 8, the LLRs from initial transmissions on codes 7 and 8 are not combined since no resources were available to retransmit interleaved encoded bits on codes 7 and 8.

The partial Chase combiner 314 can also be used in the example of FIG. 8 when more code resources were available for retransmission of interleaved encoded bits due to changes in the available Walsh code space. For example, if in FIG. 8, Nres1=3 and Nres=8, the cbuf would reflect the following:

| |
|---|
| 1 + ½ 1 + ½ 2 + ½ 4 + ½ 5 + ½ 7 + ½ 8 |
| 2 + ½ 1 + ½ 3 + ½ 4 + ½ 6 + ½ 7 |
| 3 + ½ 2 + ½ 3 + ½ 5 + ½ 6 + ½ 8 |

In the example of FIG. 9, the partial Chase combiner 314 combines the LLRs from the initial transmission on 3 codes (Nres1=3) with a portion of the LLRs from the retransmission on 8 codes (Nres=8). In this example, the modulation order changed from 16 QAM to QPSK (m=0.5*m1). The contents of the combined bit LLR buffer is shown after the first retransmission. Specifically, FIG. 9 shows that the LLRs from the initial transmission on code 1 are combined with the LLRs from the retransmission on codes 1 and 2. The LLRs from the initial transmission on code 2 are combined with the LLRs from the retransmission on codes 3 and 4. The LLRs from the initial transmission on code 3 are combined with the LLRs from the retransmission on codes 5 and 6. Finally, the combination of the LLRs from the initial transmission on code 1 and the LLRs from the retransmission on codes 1 and 2 is combined with the retransmission on codes 7 and 8.

The partial Chase combiner 314 can also be used in the example of FIG. 9 when less code resources were available for retransmission of interleaved encoded bits due to changes in the available Walsh code space. For example, if in FIG. 9, Nres1=8 and Nres=3, the combined bit LLR buffer would reflect the following:

| |
|---|
| 1 + 1&2 |
| 2 + 3 |
| 3 |
| 4 |
| 5 |
| 6 |
| 7 |
| 8 |

Those skilled in the art will recognize that various modifications and variations can be made in the apparatus and method of the present invention and in construction of this apparatus without departing from the scope or spirit of this invention. For example, the interleaved encoded data can be stored after the first transmission for a potential retransmission, or regenerated at the time of retransmission. As another example, the partial Chase combiner 314 can be separated into a partial Chase pre-combiner and a Chase combiner. This may be useful if the current Chase combining is performed after the deinterleaver 316. In this case, the partial Chase pre-combiner creates a soft block the same size as the block deinterleaver 316 operates on in a full Chase encoding/combining scenario. If the retransmission is smaller, null (soft zero) symbols are filled, and if the retransmission is larger, some of the soft received values are pre combined. Both operations happen in a pre-determined manner given the received modulation (MCS) and number of codes.

As another example, in systems with higher order modulations, partial Chase combining can be performed on a symbol (not bit LLR) basis, just like full Chase combining. However, in such a case, the modulation must not change between retransmissions. As a further example, in systems with higher order modulations, partial Chase encoding can be performed on the interleaved encoded symbols after QPSK, QAM, etc modulation, just like Chase encoding. However, in such a case, the modulation must be restricted not to change between retransmissions. As another example, if the actual codes (as opposed to logical code numbers of the code resources) used for retransmission are the same as the codes used for the first transmission (e.g., first transmission of 8 codes used codes 7 to 14, and retransmission of 5 codes uses codes 7 to 11) the spread encoded data can be used by the partial Chase encoder. However, this requires more storage.

As yet another example, the receiver has the option of separately decoding the received data before combining and jointly decoding, if necessary. This can only be successful if the received data is self-decodable; with partial Chase combining, a self-decodable block is only guaranteed if Nres*m>=Nres1*m1.

What is claimed is:

1. In a communications system comprising a plurality of communication channels, a method of transmitting data comprising the steps of:

transmitting a block of encoded data over a first plurality of communication channels; and hybrid automatic repeat request (ARQ) retransmitting all of the block of encoded data over a second plurality of communication channels, wherein the second plurality of communication channels is greater than the first plurality of communication channels and wherein the second plurality of communication channels can comprise one or more channels of the first plurality of communication channels.

2. In a communications system comprising a plurality of communication channels, a method of transmitting data comprising the steps of:

transmitting a block of encoded data over a first plurality of communication channels, wherein the block of encoded data is modulated using a first modulation and coding scheme;

hybrid automatic repeat request (ARQ) retransmitting at least a portion of the block of encoded data over a second plurality of communcation channels, wherein the at least a portion of the block of encoded data retransmitted over the second plurality of communication channels is modulated using a second modulation and coding scheme, and wherein the second modulation and coding scheme is more efficient than the first modulation and coding scheme allowing the data transmitted over two or more communication channels of the first plurality of communication channels to be transmitted over a smaller number of channels of the second plurality of communication channels; and wherein the first plurality of communication channels is a different number than the second plurality of communication channels, and wherein the second plurality of communication channels can comprise one or more channels of the first plurality of communication channels.

3. The method of claim 2 wherein the first plurality of communication channels is greater than the second plurality of communication channels and wherein when the second plurality of communication channels is full, any remaining data of the block of encoded data that was transmitted over the first plurality of communication channels is not transmitted.

4. The method of claim 2 wherein the first plurality of communication channels is less than the second plurality of communication channels and wherein the block of encoded data transmitted over the first plurality of channels repeatedly fills the second plurality of communication channels until the second plurality of communication channels is filled.

5. In a communications system comprising a plurality of communication channels, a method of transmitting data comprising the steps of:

transmitting a block of encoded data over a first plurality of communication channels, wherein the block of encoded data is modulated using a first modulation and coding scheme;

hybrid automatic repeat request (ARQ) retransmitting at least a portion of the block of encoded data over a second plurality of communcation channels, wherein the at least a portion of the block of encoded data retransmitted over the second plurality of communication channels is modulated using a second modulation and coding scheme, and wherein the first modulation and coding scheme is more efficient than the second modulation and coding scheme resulting in data transmitted over one communication channel of the first plurality of communication channels to be transmitted over tow or more channels of the second plurality of communication channels; and wherein the first plurality of communication channels is a different number than the second plurality of communication channels, and wherein the second plurality of communication channels can comprise one or more channels of the first plurality of communication channels.

6. The method of claim 5 wherein the first plurality of communication channels is less than the second plurality of communication channels and wherein the block of encoded data transmitted over the first plurality of channels repeatedly fills the second plurality of communication channels until the second plurality of communication channels is filled.

7. The method of claim 5 wherein the first plurality of communication channels is greater than the second plurality of communication channels and wherein when the second plurality of communication channels is full, any remaining data of the block of encoded data that was transmitted over the first plurality of communication channels is discarded.

8. In a communications system comprising a plurality of communication channels, a method of receiving first transmitted data and retransmitted data comprising the steps of:

receiving a block of encoded data transmitted for a first time over a first plurality of communcation channels;

receiving all of the block of encoded data that was hybrid automatic repeat request (ARQ) retransmitted over a second plurality of communication channels, wherein the second plurality of communication channels is greater than the first plurality of communication channels, and wherein the second plurality of communication channels can comprise one or more channels of the first plurality of communication channels; and combining the block of encoded data transmitted for a first time and the retransmitted block of encoded data in a buffer sized according to the number of communication channels in the first plurality of communication channels.

9. The method of claim 8 wherein the step of combining comprises addition.

10. The method of claim 8 wherein the step of combining comprises max-ratio combining.

11. The method of claim 8 wherein the block of encoded data transmitted for a first time is modulated using a first modulation and coding scheme and wherein the block of encoded data that was hybrid automatic repeat request (ARQ) retransmitted over a second plurality of communication channels is modulated using a second modulation and coding scheme; and wherein the second modulation and coding scheme is more efficient than the first modulation and coding scheme allowing the block of data received over two or more communication channels of the first plurality of communication channels to be received over a smaller number of channels of the second plurality of communication channels.

12. The method of claim 8 wherein the block of encoded data transmitted for a first time is modulated using a first modulation and coding scheme and wherein the block of encoded data that was hybrid automatic repeat request (ARQ) retransmitted over a second plurality of communication channels is modulated using a second modulation and coding scheme; and wherein the first modulation and coding scheme is more efficient than the second modulation and coding scheme allowing the block of data received over one communication channel of the first plurality of communication channels to be received over two or more channels of the second plurality of communication channels.

* * * * *